Sept. 11, 1951         J. B. BRENNAN         2,567,841
                      ELECTROLYTIC DEVICE
                   Original Filed Dec. 29, 1941
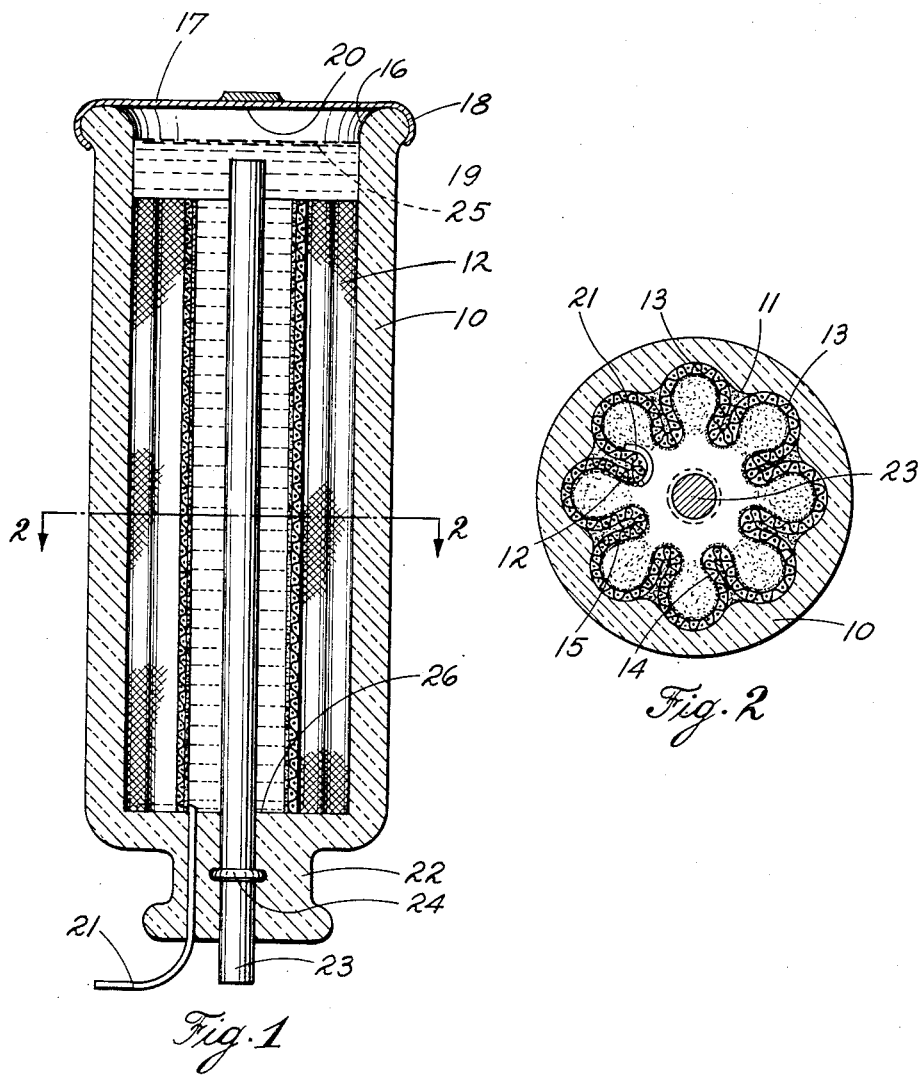
INVENTOR.
JOSEPH B. BRENNAN
BY
Bosworth & Sessions
ATTORNEYS Patented Sept. 11, 1951

2,567,841

UNITED STATES PATENT OFFICE 2,567,841

ELECTROLYTIC DEVICE

Joseph B. Brennan, Bratenahl, Ohio, assignor to Everett D. McCurdy, trustee

Application December 29, 1941, Serial No. 424,763, now Patent No. 2,429,987, dated November 4, 1947, which is a division of application Serial No. 218,910, July 13, 1938, now Patent No. 2,267,717, dated December 30, 1941. Divided and this application October 2, 1947, Serial No. 777,499

8 Claims. (Cl. 175—315)

This invention relates to electrolytic devices and more particularly to devices such as electrolytic condensers, lightning arresters, rectifiers, and the like, employing liquid electrolyte and embodying an electrode having an active surface composed of spray deposited metal. This application constitutes a division of my copending application Serial No. 424,763, now Patent No. 2,429,987, that in turn is a division of my prior application filed July 13, 1938, that has issued into Patent No. 2,267,717.

One of the objects of my invention is to provide efficient, durable and economical electrolytic condensers, lightning arresters, rectifiers, and the like, which can be manufactured with the use of a minimum amount of metal. Another object is to provide devices of this character which will have high capacities in proportion to their size. Another object is to provide such devices which can be made largely of abundant and inexpensive materials.

Further objects and advantages of my invention will become apparent from the following description of a preferred form thereof, reference being made to the accompanying drawings in which Figure 1 is a vertical section illustrating a condenser of the type embodying my invention; and Figure 2 is a section as indicated by the line 2—2 of Figure 1.

Briefly, my invention as applied, for example, to an electrolytic condenser contemplates a construction in which the electrolyte is retained within a member having an inner coating of aluminum or other suitable film forming metal, this being provided with a dielectric film when, as preferred herein, it is intended to constitute the anode of the condenser. Preferably the coating is prdouced by spraying molten metal on the surface of the member as described, for example, in my Patent No. 2,104,018 issued January 4, 1938. The member is preferably made of an inexpensive material, with an inner surface composed of an insulating material which is resistant to the action of the electrolyte such as glass, porcelain, various synthetic resins, and the like, which forms a base or support for the spray deposited coating. In order to increase the area of the member, the inner surface thereof is provided with flutes or corrugations. To further increase the capacity of the condenser, flexible electrode members conforming at least in part in contour to the electrolyte retaining member, and provided with spray deposited active surfaces are also employed. The other electrode may be of similar construction although in the presently disclosed embodiment of the invention it constitutes simply a conductive rod suspended within the electrolyte.

Referring now to Figures 1 and 2 I have illustrated a preferred form of my invention embodied in a condenser of the liquid type. The liquid electrolyte is retained within a hollow tubular member 10 which is preferably molded of any inexpensive insulating material which will not contaminate the electrolyte in service. Suitable materials are glass, various hard rubbers, formaldehyde or phenol formaldehyde resins. Any inexpensive, moldable insulating materials may be employed so long as they are inert to the action of the electrolyte. In this connection, it is to be noted that when hard rubber is employed it should have a low sulphur content.

The interior surface of the member 10 is corrugated or fluted as indicated at 11 and the effective electrode area is greatly increased by an insert 12 of flexible porous material such as cloth or fibrous material, and having curved portions 13 conforming to the surface of the member 10 and inwardly extending fins 14. This insert is placed within the container 10 and then the assembly sprayed with finely divided molten aluminum or other film forming metal to form the anode surfaces indicated diagrammatically at 15, the sprayed aluminum also functioning to hold the flexible form in place within the container and to stiffen it somewhat so that it will retain its shape in use.

The anode is provided with an electrically formed dielectric film of a type depending upon the service for which the condenser is intended. The film may be formed in any well-known manner, preferably before assembly of the several parts, for example, by subjecting the electrode to electrolysis as an anode in an electrolyte containing a suitable film forming material such as boric acid or borax, the formation being continued until the desired low leakage is obtained at a voltage somewhat in excess of the intended service voltage of the condenser.

The container may be closed by any convenient construction, for example, the open upper end 16 may be closed by a thin metallic cap 17 spun downwardly as at 18 around a bead 19 and provided with a suitable vent 20. The terminal for the sprayed anode surface 15 may consist of a wire 21 molded into the neck portion 22 of the container 10 and extending into contact with the sprayed surface.

The cathode may comprise a rod 23 provided with an enlarged portion 24, and also molded into the neck portion 22. The enlarged portion serves to prevent the cathode from being displaced with relation to the neck and also assists in preventing leakage of the electrolyte around the cathode. The sprayed surfaces preferably terminate below the normal liquid level of the electrolyte 25 and the central portion 26 of the lower surface of the container is not sprayed so that there will be no possibility of a short circuit taking place between the cathode and anode at this point.

Any type of liquid electrolyte such as an aqueous solution of borax and boric acid may be used in the present invention.

It is to be noted that the container 10 may be made of an inexpensive metal such as steel with the inner surfaces thereof protected from the electrolyte by an adherent layer of an inert insulating material such as porcelain enamel. This general type of construction is more fully described in my prior Patent No. 2,267,717 referred to above.

From the foregoing it will be evident that by my invention I have provided an electrolytic device which can be readily and economically manufactured and which may be composed principally of very inexpensive materials, the amount of metal employed being kept at a minimum. By reason of the use of material such as porcelain, glass, and various synthetic resins in my condensers, the danger of contamination in the condenser is reduced to a minimum and a durable, long-lived condenser is insured. The construction of such devices embodying spray deposited layers on bases of insulating material in conjunction with spray deposited layers of flexible porous material such as fabric produces compact condensers of high capacity and efficiency, while the use of insulating materials as bases for the sprayed layers materially reduces the amounts of high purity metals required.

In the foregoing specification I have described my invention as applied to a preferred type of electrolytic condenser. It will be evident that my invention may be adapted to other electrolytic devices than that described above and that various changes and modifications may be made therein without departing from the teachings of my invention. Therefore it is to be understood that my patent is not limited to the preferred form described herein or in any manner other than by the scope of the appended claims.

I claim:

1. An electrolytic device comprising a container having an inner surface of electrolyte-impervious insulating material, a fibrous form disposed within said container and having a spray deposited porous metallic layer thereon constituting one electrode of the device, and another electrode supported within the container, the spray deposited particles securing said fibrous form to the inner surface of said container.

2. An electrolytic device comprising a container having a surface composed of electrolyte-impervious material, a porous electrode member disposed at least in part in contact with and bonded to said surface and having a porous layer composed of finely divided cohering metal particles thereon constituting one electrode of the device, the metallic particles securing said member to said surface.

3. An electrolytic device comprising a container having an inner surface composed of electrolyte-impervious insulating material, a fabric form having outer portions in contact with said surface and fins extending inwardly away from said surface disposed within said container and having a spray-deposited metallic layer thereon constituting one electrode of the device, the spray-deposited particles securing said fabric form to the inner surface of said container, and another electrode supported within the container.

4. An electrode for an electrolytic device comprising a hollow support composed of electrolyte-impervious insulating material, a porous body having a portion in contact with the inner surface of the support and having inwardly extending fins extending away from said surface and disposed within said support, said body having a porous layer of film-forming material thereon, said porous layer of film forming material securing said porous body to the inner surface of said hollow support.

5. An electrolytic device comprising a container with an inner surface composed of insulating material defining a generally cup shaped opening, a fibrous form arranged about the side walls of said inner surface and having portions in contact with said inner surface and provided with a plurality of folds doubled back on themselves to give said form an area materially greater than the area of said inner surface, a porous layer of film-forming material on said form constituting one electrode of the device and a second electrode mounted on said container, said porous layer of film forming material securing said fibrous form to the inner surface of said container.

6. An electrolytic device comprising a container with an inner surface composed of insulating material defining a generally cylindrical opening, a fabric form coaxial with said cylindrical opening arranged about said inner surface and having portions in contact with said inner surface and provided with a plurality of folds doubled back on themselves and extending substantially radially toward the cylindrical axis of said opening, a porous conductive layer of film-forming material on said form constituting one electrode of the device and a second electrode mounted in said container substantially coincident with said cylindrical axis.

7. An electrolytic device comprising a container having integral side walls and an end wall with an inner surface composed of insulating material defining a generally cylindrical cup shaped opening, a fabric form coaxial with said opening arranged in contact with the side walls of said inner surface and provided with a plurality of folds doubled back on themselves and extending substantially radially toward the cylindrical axis of said opening, a porous conductive layer of film-forming material on said form constituting one electrode of the device, a second electrode mounted in said container, leads for said electrodes molded in said container walls and a cap permanently secured to said container across the end of said opening opposite said end wall.

8. An electrolytic device comprising a container having integral side walls and an end wall with an inner surface composed of insulating material defining a generally cylindrical cup shaped opening, a fabric form coaxial with said opening arranged in contact with the side walls of said inner surface and provided with a plurality of folds doubled back on themselves and extending substantially radially toward the cylindrical axis of said opening, a sprayed layer of film-forming material on said form constituting one electrode of the device and bonding said form to said surface, a second electrode mounted in said container, leads for said electrodes molded in said container walls and a cap permanently secured to said container across the end of said opening opposite said end wall.

JOSEPH B. BRENNAN.

REFERENCES CITED

The following references are of record in the file of this patent:

UNITED STATES PATENTS

| Number | Name | Date |
|---|---|---|
| 1,509,186 | Benner | Sept. 23, 1924 |
| 1,639,280 | Benner | Aug. 16, 1927 |
| 2,047,452 | Zahodiakin | July 14, 1936 |
| 2,104,018 | Brennan | Jan. 4, 1938 |
| 2,280,789 | Brennan | Apr. 28, 1942 |
| 2,297,607 | Blackburn | Sept. 29, 1942 |
| 2,375,211 | Brennan | May 8, 1945 |

FOREIGN PATENTS

| Number | Country | Date |
|---|---|---|
| 394,485 | Great Britain | June 29, 1933 |
| 438,934 | Great Britain | Nov. 26, 1935 |